March 7, 1939.    I. W. ROBERTSON    2,150,105
MARGINAL REINFORCING FOR TREADS
Filed May 3, 1935
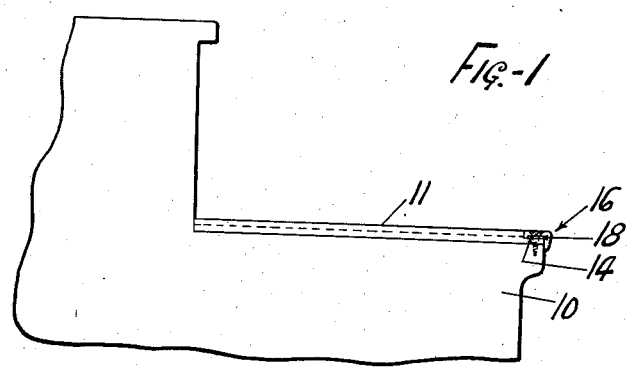
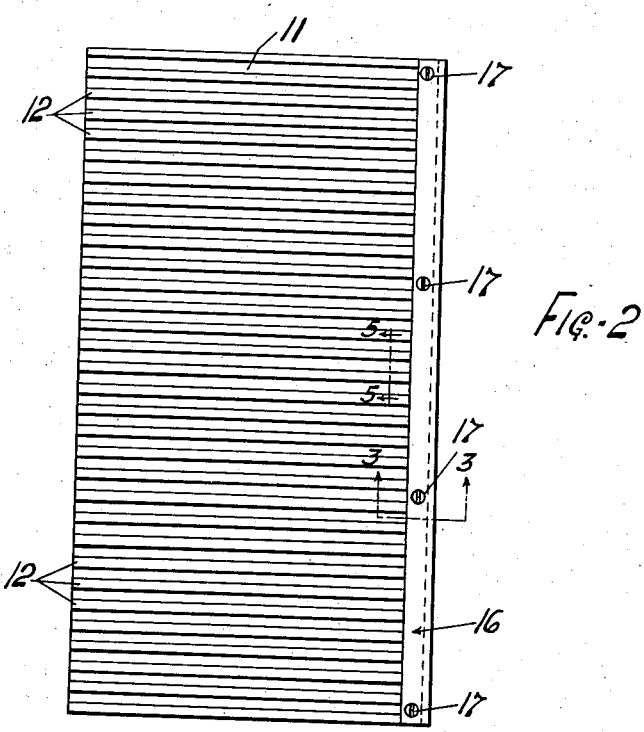
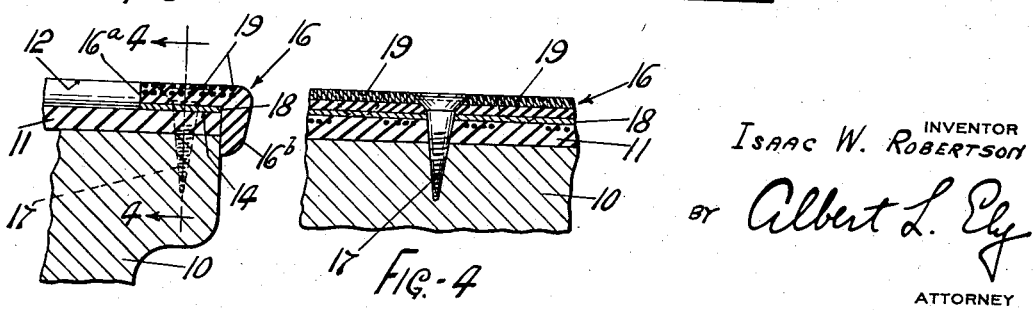
INVENTOR
ISAAC W. ROBERTSON
BY Albert L. Ely
ATTORNEY Patented Mar. 7, 1939

2,150,105

UNITED STATES PATENT OFFICE 2,150,105

MARGINAL REINFORCING FOR TREADS

Isaac W. Robertson, Akron, Ohio, assignor to The Firestone Tire & Rubber Company, Akron, Ohio, a corporation of Ohio Application May 3, 1935, Serial No. 19,566

4 Claims. (Cl. 20—79)

This invention relates to marginal reinforcings for treads, and more especially it relates to means for reinforcing and holding down a marginal portion of safety treads such as step plate mats, running board mats, and stair treads.

Treads or mats of the character mentioned usually are made of rubber in long lengths or in large pieces that subsequently are cut to the size required. Hence it is difficult to incorporate therein means for providing a marginal reinforcement for the mats or treads in their ultimate form, and consequently it is common practice to provide separate edging strips for the mats, which strips prevent scuffing of the mat-edges during use. Heretofore these edging strips have been made of metal, and have been found not satisfactory for the reason that they become smooth and polished with use, and thus become a hazard to safety.

The chief objects of this invention are to provide an improved edging strip for mats and the like that will not wear smooth, or become slippery under any conditions; and to provide a strip of the character mentioned that will be of sufficient rigidity to bind the mat-edge firmly to its underlying support.

Of the accompanying drawing,

Figure 1 is a side elevation of a step, such as a stair step, and a tread member mounted thereon and provided with the improved marginal reinforcing member;

Figure 2 is a plan view of the tread member and reinforcing structure shown in Figure 1;

Figure 3 is a section on the line 3—3 of Figure 2;

Figure 4 is a section on the line 4—4 of Figure 3; and

Figure 5 is a section on the line 5—5 of Figure 2.

Referring to the drawing, 10 is a stair step and 11 is a rubber tread or mat thereon, which mat may be of any desired construction and is shown herein as having a top surface formed with upstanding parallel ribs 12, 12. Incorporated in the latter are fabric inserts designed to provide friction for preventing slipping, said inserts being composed of strand material so arranged that the ends of the strands are exposed at the surface, as shown at 13, 13, Figure 5. Preferably the inserts consist of rubberized cord strands such as are used in the carcasses of cord tires, and the cords may be positioned perpendicular to the wearing surface of the mat, or oblique thereto. In the embodiment of the invention illustrated, the front edge of the mat 11 is flush with the front edge of the stair step 10, and is rabbeted to substantially half its thickness, as shown at 14.

Mounted upon the rabbeted portion 14 is one of the improved marginal reinforcing strips, said strip being composed mainly of rubber, and generally designated 16. Said strip is L-shaped in section, having a portion 16$^a$ seating in the rabbet 14 and having its top face flush with the top surface of the mat, and having a portion 16$^b$ that is perpendicular to the portion 16$^a$ and extends over the marginal surface of the mat and onto the adjacent face of the step 10. The marginal strip 16 is secured to the mat 11 by means of wood screws 17, 17 that pass through the strip and mat and penetrate into the underlying wood structure. The underside of portion 16$^a$ of strip 16 has a strip of metal 18 vulcanized thereto, said metal being coextensive with that surface of the strip and being suitably apertured to accommodate the shanks of screws 17 whereby the metal strip prevents the edging strip from being pulled away from said screws. The top face of portion 16$^a$ of the strip 16 is composed chiefly of rubberized cord strands 19 that are vulcanized into the structure of the strip and arranged obliquely to the surface thereof, as shown in Figure 4, so as to present their ends upon said surface.

The invention makes for safety, and is applicable in situations other than that shown. Thus the edging strip may be applied to other margins of a mat that are not at the edge of a step, in which case the portion 16$^b$ of the strip will be shortened so that its edge abuts the floor or other underlying structure.

Modifications may be resorted to without departing from the spirit of the invention or the scope of the appended claims.

What is claimed is:

1. The combination which comprises a flexible mat formed with a rabbeted marginal portion in its top face, an edging strip seating in said rabbet and having a portion extending beyond the edge of the mat, and a metallic reinforcement integral with the edging strip and seated in said rabbet.

2. The combination which comprises a flexible mat, a rubber edging strip overlying a marginal portion and adjacent edge thereof, the top face of said strip being flush with the top of the mat, and a concealed metal reinforcing strip vulcanized to the bottom face of the edging strip.

3. The combination which comprises a flexible mat, a rubber edging strip overlying a marginal portion and adjacent edge thereof, said strip being flush with the top face of the mat, and a metal reinforcing strip incorporated in that portion of the strip that overlies the mat, said strip being apertured to receive the shank portions of screws that extend through the mat and strip to secure them to an underlying structure.

4. The combination which comprises a flexible mat formed with a rabbetted marginal portion in its top face, a non-metallic edging strip having at least a portion of its structure seated in said rabbet, a metallic reinforcement on the under side of said edging strip, said reinforcement being coextensive with said rabbet, and means extending through the strip and its reinforcement for attachment to an underlying structure.

ISAAC W. ROBERTSON.